Sept. 16, 1924.                    W. MIDDELMAN                    1,508,463
                                  EGG RECORDING NEST
                                  Filed Nov. 7, 1923
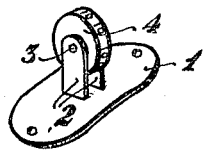
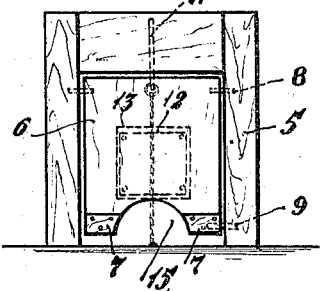
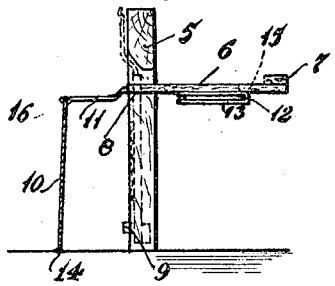
Inventor
W. Middelman
By Marks & Clerk
Attys.

Patented Sept. 16, 1924.

1,508,463

UNITED STATES PATENT OFFICE.

WILLEM MIDDELMAN, OF BARNEVELD, NETHERLANDS.

EGG-RECORDING NEST.

Application filed November 7, 1923. Serial No. 673,364.

*To all whom it may concern:*

Be it known that I, WILLEM MIDDELMAN, a poultry-farm keeper, residing at Barneveld, the Netherlands, have invented certain new and useful Improvements in Egg-Recording Nests, of which the following is a specification.

The invention has reference generally to improvements in that class of inventions known as animal husbandry and more particularly relates to an egg recording nest for hens.

The invention has for its object to provide a device of such a nature, that the hen indicates which egg it has laid, while the parts are arranged to permit the hen to subsequently leave the nest unaided.

The invention consists in egg recording nest for hens and the like in which a marking-apparatus is provided on the back of the hen and which marking apparatus is constructed in such a manner that the hen provided therewith when leaving the nest makes a mark, numeral, number or the like on the trap door.

According to the invention the marking-apparatus consists chiefly of a horizontal shaft easily rotatable in two bearings while upon the shaft a little wheel is fixed, the periphery of which is provided with a plurality of similar marks, numerals or the like in high relief. The trap door of the nest is rotatable about horizontal trunnions and is provided at the upper side with a vertical pin and at the lower side with a weight, while further at the inside of the trap door a device is arranged adapted for receiving impressions or off-prints which the marking apparatus on the back of the hen makes thereupon.

In normal position the trap door is kept open by a device located inside the nest such as a little chain, string, hook or the like, the end of which engages the vertical pin of the trap door and which device is released by a hen upon entering the nest. To the lower portion of one of the trap door posts a stop is attached in such a manner that the door in closed position rests on this stop.

On the accompanying drawing one of the embodiments of a device according to the invention is shown by way of example.

Fig. 1 is an elevation in perspective of the marking apparatus that is to be attached on the back of a hen.

Fig. 2 is a front elevation seen in the direction of the closed trap door of the nest.

Fig. 3 is a section on the opened trap door.

The marking apparatus consists of a thin plate 1, carrying two brackets 2. In these brackets rests easily a rotatable shaft 3 carrying the wheel 4. This wheel is provided at its periphery with an identification plurality of numbers arranged in high relief thereupon. It goes without saying that the material from which these parts are made should be as light as possible, e. g. aluminum. The plate is attached by means of a thin belt on the back under the wings of the hen.

In the front face of the trap nest there is provided a door frame 5 in which the trap door 6 is suspended from two horizontal trunnions 8 while at the lower side a pair of weights 7 is provided for facilitating the rapid closing of the door.

The trap door is also provided at the lower edge with a semicircular opening 15 which is of such a size as to permit a hen passing only its head and neck therethrough.

At the upper side of the trap door a pin 11 (see Fig. 3) is provided and by means of a flexible element such as a string 10 which has one end secured to the bottom of the nest as at 14 and carries at the other end a small ring 16 for releasably engaging the outer end of the pin 11 so that the trap door may be kept open in the manner shown by the drawing.

It is to be noted in this instance that the string is located a short distance in the nest about centrally in front of the trap door opening. Upon the inner surface of the trap door a sheet of writing paper 13 is arranged under which is provided the carbon paper 12.

Further a stop 9 is secured against the lower side of one of the trap door posts against which stop the trap door rests in the closed position.

The operation of the device is as follows:

All trap nests are open in the morning with the trap doors connected to the strings 10, and extended outwardly from the nest while a sheet of paper 13 is stretched upon the trap door over the carbonpaper 12.

As soon as a hen enters one of the nests for laying an egg, it will loosen the ring 16 when passing the pin 11 and the trap-door closes behind it in the position indicated by dotted lines in Fig. 3.

In this position a second hen can not enter the nest owing to the door lying against the stop 9.

After having laid an egg a hen as it leaves the nest will first pass its head through the opening 15 and thus advancing easily raise the trap door. During the raising of the trap door the wheel on the back of the hen moves along the writing paper; the numerals at the periphery of the wheel press thereupon and owing to the presence of the underlying carbonpaper leave an impression on the inner side of the paper.

By virtue of the fact that the hen passes its head through the opening the wheel is brought into the right position with regard to the paper. The weights 7 now perform their function by making the door heavier and the impression of the numeral clearer.

The trap door closes behind the hen and no other hen can enter the nest.

In the evening an attendant can verify which trap doors are closed and remove the eggs; upon the inner side of each trap door the attendant finds then the number of the hen which has laid the egg in the corresponding nest.

It may be further remarked that the above described device may be subjected to many structural modifications without, however, departing from the principle upon which the invention is based.

I claim:—

1. In an egg recording nest, a single vertically swingable hen operable trap door normally held in an outwardly extending and raised position to permit a hen to enter the nest and operable by the hen upon entering the nest to permit the same to move to a closed position, and a marking device including a plate adapted to be secured to the back of the hen, spaced brackets projecting from the outer surface of the plate, a wheel journaled in the brackets and provided on its circumference with a series of the same indentification numerals, and a paper supporting frame carried by the back of the door and adapted to receive a sheet of paper upon which the indentification numeral on the wheel is impressed when the hen leaves the nest.

2. An egg recording nest, a single vertically swingable hen operable trap door, retaining means located within the nest and directly connected with the door for normally holding the door in an outwardly extended and raised position to permit a hen to enter the nest and operable by the hen on entering the nest for releasing the door to permit the door to move to a closed position, and cooperative marking and recording means adapted to be carried on the back of the hen and on the inner face of the door for making a mark on the door when a hen leaves the nest.

3. An egg recording nest comprising a single door frame, a hen operable trap door swingably supported in the upper part of the frame, an upright pin extending from the upper edge of the door and located on the inner side of the door frame, a flexible element having one end rigidly secured within the nest and the other end detachably engaged with the outward edge of the pin for normally holding the door in an outwardly extending and raised position to permit a hen to enter the nest but adapted to be disconnected by a hen upon entering the nest to permit the door to move to a closed position, stops provided on the door frame to prevent inward swinging of the door, weights on the lower edge of the door to facilitate the rapid closing of the door, a marking device including a bracketed plate adapted to be secured to the back of the hen, a wheel journalled in the plate and provided with corresponding numerals on the outer periphery, and a paper supporting frame carried on the back of the door and adapted to contain a sheet of paper upon which the numeral is impressed on the wheel by the hen when leaving the nest, substantially as and for the purposes set forth.

In testimony whereof I affix my signature.

WILLEM MIDDELMAN.